(12) United States Patent
Faivre

(10) Patent No.: US 9,226,438 B2
(45) Date of Patent: Jan. 5, 2016

(54) DEVICE FOR COUPLING A LOADER CONNECTING MAST TO A CONNECTING FRAME

(71) Applicant: Deere & Company, Moline, IL (US)

(72) Inventor: Damien Faivre, Apremont (FR)

(73) Assignee: DEERE & COMPANY, Moline (IL)

( * ) Notice: Subject to any disclaimer, the term of this patent is extended or adjusted under 35 U.S.C. 154(b) by 0 days.

(21) Appl. No.: 14/501,236

(22) Filed: Sep. 30, 2014

(65) Prior Publication Data

US 2015/0093227 A1    Apr. 2, 2015

(30) Foreign Application Priority Data

Oct. 1, 2013  (DE) .......................... 10 2013 219 931

(51) Int. Cl.
*E02F 3/627* (2006.01)
*A01B 59/06* (2006.01)
*E02F 9/22* (2006.01)

(52) U.S. Cl.
CPC ............... *A01B 59/064* (2013.01); *E02F 3/627* (2013.01); *E02F 9/2203* (2013.01)

(58) Field of Classification Search
CPC ........ A01B 59/064; E02F 3/627; E02F 3/422; E02F 9/2203
USPC .................................. 414/686; 172/272–275
See application file for complete search history.

(56) References Cited

U.S. PATENT DOCUMENTS

| | | | | |
|---|---|---|---|---|
| 6,386,821 B1 | * | 5/2002 | Schneider | 414/686 |
| 6,986,634 B2 | * | 1/2006 | Westendorf et al. | 414/686 |
| 7,353,885 B2 | * | 4/2008 | Nordhoff | 172/272 |
| 7,530,779 B2 | * | 5/2009 | Holloway et al. | 414/686 |
| 7,549,832 B2 | | 6/2009 | Mailleux | |
| 7,632,056 B2 | * | 12/2009 | Nilsson | 414/723 |

FOREIGN PATENT DOCUMENTS

EP        0 479 708        *  4/1992

* cited by examiner

*Primary Examiner* — Dean Kramer

(57) ABSTRACT

A front loader arrangement (12) includes a mounting frame (16) and a mounting mast (18), wherein the mounting mast (18) can be quickly coupled to, and decoupled from, the mounting frame (16), and wherein a locking device for locking the mast to the frame is provided and includes a pivoting locking bar (54) pivotable between locking and unlocking positions. Simple coupling and decoupling is enabled by a supporting hinge (62) that is pivotally mounted to the locking bar (54) and is configured in such a manner that a pivoting movement of the pivoting locking bar (54) into the locking position is blocked by the supporting hinge upon a relative movement between the mounting mast (18) and the mounting frame (16) for decoupling purposes and is released by the supporting hinge upon a relative movement between the mounting mast (18) and the mounting frame (16) for coupling purposes.

11 Claims, 11 Drawing Sheets

DEVICE FOR COUPLING A LOADER CONNECTING MAST TO A CONNECTING FRAME

FIELD OF THE INVENTION

The invention relates to a front loader arrangement with a mounting frame and a mounting mast, wherein the mounting mast can be coupled to the mounting frame and can be decoupled therefrom, and wherein a locking device for locking the front loader arrangement is provided, which locking device comprises a pivoting locking bar which is pivotable between a locking position and an unlocking position.

BACKGROUND OF THE INVENTION

Front loader arrangements, i.e., the arrangement of a front loader on a vehicle, in particular on an agricultural vehicle, or else on a different type of utility vehicle, are known. Front loaders can be connected to, or mounted on, a vehicle, for example on a tractor or an agricultural tractor, by means of a mounting frame, in order to carry out loader operations. The mounting frame is customarily screwed to the vehicle frame or fastened to the latter. The front loader itself has a connecting or mounting point or mounting mast which is connected to, or is mounted on, or coupled to, the console. Various possibilities are known in this respect. Some known exemplary embodiments of front loader arrangements have mechanisms which are formed on the console and serve for receiving two bearing bolts formed on the mast arrangement of the front loader, wherein at least one of the catch hooks is locked after receiving the bearing bolts. The bearing bolts are received here by the mounting frame being guided up to, or the vehicle being driven up to, the mounting mast or to the front loader which is in a corresponding parking position or mounting position. After the bearing bolts have been received, the catch hooks can be locked manually or else in a partially automated or fully automated manner or by an external motor or by remote control. In other mechanisms, the console has only one catch hook which serves for receiving a bearing bolt formed on the mast arrangement. For locking purposes, connecting openings are then formed both on the mounting frame and mounting mast, with the connecting openings, when brought into alignment with each other, being connected to each other via a locking bolt, or a locking bolt is guided therethrough. The locking can also take place here manually or else in a partially automated or fully automated manner or by an external motor or by remote control.

Such a partially automated locking is disclosed in U.S. Pat. No. 7,632,056, granted Dec. 15, 2009 which presents a front loader arrangement which comprises a spring pre-tensioned locking bolt which can be actuated via adjusting elements formed on a mounting mast and on a mounting frame by the adjusting elements, by means of a relative movement with respect to one another, triggering a locking in such a manner that the locking bolt is guided by spring force into connecting openings formed on the mounting mast and on the mounting frame of the front loader arrangement. For unlocking purposes, the locking bolt has to be guided manually out of the connecting openings counter to the spring force and the adjusting elements have to be brought into a corresponding unlocking position. It is disadvantageous in this connection that, in particular, the design and arrangement of the adjusting element formed on the mast arrangement, and also the connection of said adjusting element to the locking bolt require a relatively complex outlay in terms of manufacturing and installation.

Furthermore, U.S. Pat. No. 7,549,832, granted Jun. 23, 2009, discloses a front loader arrangement, in which the mounting mast is guided via a ramp formed on the mounting fame wherein the mounting frame has catch hooks in which bearing bolts formed on the mounting mast are received. The front loader arrangement can be locked via a spring pre-tensioned spring-loaded locking catch, which engages in a first depression and then a second depression formed on the frame, wherein a pre-locking is formed here, in which the spring-loaded locking catch engages in the first depression and the mounting mast is still movable relative to the mounting frame until the mounting mast reaches the end position thereof, in which the bearing bolts have been fully inserted into the catch hooks. Only then does the spring-loaded locking catch snap into the second depression, at which final locking arises. Disadvantages here include the fact that, firstly, the design and arrangement of the spring-loaded locking catch provided on the mounting mast and, furthermore, the first and second depressions which are formed on the mounting frame and are intended for the pre-locking and final locking require a relatively complex outlay in terms of manufacturing and installation and also a great diversity of components.

SUMMARY OF THE INVENTION

The problem on which the invention is based is considered that of specifying a front loader arrangement of the type mentioned at the beginning, by means of which one or more of the above-mentioned disadvantages are overcome.

The object is achieved according to the invention by the teaching of claim 1. Further advantageous refinements and developments of the invention emerge from the dependent claims.

According to the invention, a front loader arrangement of the type mentioned at the beginning is designed in such a manner that the pivoting locking bar comprises supporting means which are designed in such a manner that a pivoting movement of the locking bar into the locking position is blocked upon a relative movement between the mounting mast and the mounting frame for decoupling purposes and is released upon a relative movement between the mounting mast and mounting frame for coupling purposes. During the decoupling, the pivoting locking bar is thereby held by the supporting means in the open position of the locking bar, into which said pivoting locking bar has previously been brought for decoupling purposes. The supporting means here are designed in such a manner that, although they are arranged for moving with the locking bar itself, after release of the pivoting locking bar from the locking position thereof, the supporting means are also in engagement with the mounting frame for as long as the latter is in contact with the mounting mast.

The mounting frame can comprise a ramp along which the mounting mast can be displaced and guided for coupling and decoupling purposes, wherein the pivoting locking bar is mounted on the mounting mast and comprises a first pivoting arm which is provided with a step which is directed towards the ramp and can be brought by the pivoting movement into a depression formed on the ramp. The ramp here can extend between two catch hooks which are provided for receiving bearing bolts formed on the mounting mast, as a result of which the mounting mast can be coupled to the mounting frame. During the coupling, the pivoting locking bar is guided by the first pivoting arm thereof over the ramp until the step formed on the pivoting arm reaches the region of the depression and latches there or snaps into the depression or penetrates the latter or is pushed therein by, for example, spring force or in another manner. The pivoting locking bar can be arranged in such a manner that the pivoting arm extends with the pivotable end thereof in the direction of a front loader which is to be coupled or is coupled, i.e., points away from a carrier vehicle, for example a tractor, or, put another way, a pivot axis of the pivoting locking bar is arranged between the carrier vehicle and the pivotable end of the pivoting arm.

The supporting means is arranged at a free end of a first pivoting arm of the pivoting locking bar and is biased by a spiral spring to take up a spring pre-tensioned supporting position, wherein, upon a relative movement between the mounting mast and the mounting frame for coupling purposes, the supporting means can be pivoted out of the supporting position thereof, and wherein, upon a relative movement between the mounting mast and the mounting frame for decoupling purposes, the supporting means is held in the supporting position thereof or is pushed into the latter. The relative movements mentioned here can directly or indirectly constitute the cause of the pivoting movement or of the holding or pushing of the supporting means, and therefore a pivoting or holding or pushing occurs not only during the corresponding relative movement but is even brought about by the corresponding relative movement. The supporting means can be coupled to a pre-tensioning spring which is arranged at the pivotable end of the pivoting arm and brings the supporting means into contact with the pivotable end of the pivoting arm, whereupon said supporting means takes up the supporting position thereof if no other forces oppose this. The supporting means can be connected pivotally as a supporting hinge, supporting plate, supporting foot or else as a bar or link at the end of the pivoting arm to the pivoting arm by an articulated arrangement. The supporting means here can extend in the supporting position thereof from the end of the pivoting arm downwards as far as the ramp, i.e., can first of all take up a substantially perpendicular position to the ramp surface, along which said supporting means slides during a relative movement between the mounting frame and the mounting mast. During a relative movement, in which the mounting mast is moved away from the carrier vehicle or from the mounting frame, i.e., during the decoupling, the supporting means can be pushed or pressed or held in the direction of the pivot axis of the pivoting locking bar towards the end of the pivoting arm by the frictional forces acting between the ramp and supporting means, as a result of which the supporting means maintains an upright or perpendicular position with respect to the surface of the ramp. During a relative movement between the mounting frame and the mounting mast, in which the carrier vehicle or the mounting frame fastened thereto is moved towards the mounting mast, i.e., during the coupling, the supporting means is pressed against a ramp end on the mounting frame. The supporting means can be pivoted here from the supporting position thereof in the direction of an opening-out position, i.e., away from the end of the pivoting arm, in which the supporting position is neutralized. Over the further course of an identical relative movement, the supporting means here can be increasingly opened out, by the frictional forces acting between the frame and the supporting means, until the supporting means takes up a position oriented substantially parallel to the ramp surface, in which case the pivoting locking bar can take up the locking position thereof.

A tension spring is provided which pre-tensions the pivoting locking bar into the locking position. However, the pivoting locking bar can also be pushed into a locking position on account of the gravitational force thereof. The tension spring can furthermore act directly on the first pivoting arm or on a second pivoting arm of the pivoting locking bar in such a manner that a spring force pushes the pivoting locking bar into the locking position thereof. The tension spring can be arranged in such a manner that the first pivoting arm is pushed in the direction of the ramp surface.

Furthermore, an actuating device can be provided, which actuating device has a shaft which is mounted on the mounting mast and is rotatable via an actuating lever arranged at one end of the shaft, wherein an adjusting arm is formed on the shaft, which adjusting arm extends radially with respect to the shaft and can be brought into engagement with the pivoting lever in order to pivot the latter from the locking position into the unlocking position. The adjusting arm can be formed by an eccentric, bolt, pin or the like, and therefore a pivoting of the actuating lever on the shaft brings about a rotational movement of the shaft and triggers a pivoting of the adjusting arm. The adjusting arm, in turn, can thereby be brought into engagement with the pivoting locking bar, and therefore the latter executes a pivoting movement from a locking position into an unlocking position.

The front loader arrangement can furthermore comprise a loader arm which is connected to the mounting mast and is pivotable via a hydraulic cylinder extending between the loader arm and the mounting mast, wherein adjusting means are provided on the front loader device, by means of which adjusting means the hydraulic cylinder can be brought into a floating position when the hydraulic supply is decoupled from a vehicle. Owing to the fact that the hydraulic cylinder is brought into a floating position, the mounting mast can move relatively freely and is not blocked by the hydraulic cylinder, as is otherwise customary during the coupling, since a hydraulic connection between the vehicle and the front loader arrangement has been disconnected during the decoupling and, during the coupling, can only be actuated by an operator in a further step if the mounting mast has been coupled to the mounting frame. In particular, the mounting mast can be pivoted about the coupling point thereof with respect to the loader arm, i.e., relative to the loader arm, and, for example during the coupling, can be adapted to a positioning angle with respect to the mounting frame or aligned with respect to the latter. An alignment takes place here by the bearing bolts of the mounting mast sliding over the ramp during the coupling and being guided into the catch hooks, wherein, by means of this interaction, the bearing bolts are brought into the position thereof provided for the coupling. Without the above-mentioned floating position of the hydraulic cylinder, the mounting mast would be in a rigid connection with respect to the loader arm such that the mounting mast cannot carry out any pivoting movements relative to the loader arm. Therefore, should the geometrical dimensions between the vehicle and the front loader arrangement have changed during a time in which the front loader arrangement was decoupled from the vehicle, which is entirely possible, for example due to location instabilities (ground unevenness, subsidence of the ground, etc.), change in the filling of the tires of the vehicle, changes to the tire size, leakages in the hydraulics of the front loader device or because of other circumstances, then a change in the positioning angle of the mounting mast with respect to the mounting frame is generally also associated therewith, as a result of which the next coupling of the front loader arrangement is made considerably more difficult, since, because of the rigid connection between the mounting mast and the loader arm, the entire front loader arrangement (apart from the mounting frame) has to be raised, displaced, lowered, tilted, etc., and therefore also the entire weight of the front loader arrangement has to be moved until the mounting mast has be aligned in a manner corresponding to the mounting frame.

The adjusting means can comprise a hydraulic accumulator and a manually actuated shut-off valve via which the hydraulic cylinder can be connected hydraulically by a piston-head-side chamber to a hydraulic accumulator. By opening the shut-off valve, the hydraulic accumulator is connected hydraulically to the head end chamber of the hydraulic cylinder and therefore hydraulic oil can flow out of the hydraulic cylinder into the hydraulic accumulator and vice versa and the piston, in the hydraulic cylinder and the piston rod connected to the piston can move freely. As a result, the mounting mast, as already described above, can also move relatively freely or can be freely pivoted or aligned. The shut-off valve is preferably opened directly after the front loader is decoupled from the vehicle, with a hydraulic supply from the vehicle for the hydraulic cylinder of the front loader arrangement (operating hydraulics) customarily also being interrupted or decoupled, as a result of which the hydraulic cylinder is already held in a floating position and is prepared for the next coupling. Of course, the shut-off valve can also be opened just immediately before the next coupling. Although a manual opening can be provided here, this will only ensure that the floating position for the hydraulic cylinder can be set irrespective of the vehicle hydraulics or of operating hydraulics for the front loader arrangement. It is entirely also conceivable here to provide a mechanical or electric device for opening the shut-off valve if said device can be operated independently of the operating hydraulics of the front loader or ensures the opening of the shut-off valve independently of the operating hydraulics, i.e., enables the shut-off valve to open if a connection to the operating hydraulics is interrupted.

The hydraulic cylinder can furthermore also be formed in a double-acting manner with rod end and head end chambers, wherein the shut-off valve is arranged between the two chambers and the hydraulic accumulator is arranged between the shut-off valve and the rod end chamber. By opening the shut-off valve, the two chambers are bypassed, with a floating position for the hydraulic cylinder being achieved, and with the volumetric differences or the cross-sectional differences between the two chambers being compensated for by the hydraulic accumulator. Furthermore, the same statements as described above apply, and therefore the mounting mast can move relatively freely or can be freely pivoted or aligned. The shut-off valve is preferably also opened here directly after the decoupling of the front loader from the vehicle, as a result of which the hydraulic cylinder is already held in the floating position and is ready for the next coupling. Of course, the shut-off valve can also be opened just immediately before the next coupling. Although a manual opening can be provided her, this will only ensure that the floating position for the hydraulic cylinder can be set independently of the vehicle hydraulics or of the operating hydraulics for the front loader arrangement. It is entirely also conceivable here to provide a mechanical or an electrical device for opening the shut-off valve if the latter can be operated independently of the hydraulics of the front loader or ensures the opening of the shut-off valve independently of operating hydraulics, i.e., enables the shut-off valve to open if a connection to the operating hydraulics is interrupted.

The above-described front loader arrangement can be used on various carrier vehicles, but in particular on agricultural vehicles, such as tractors.

The invention and further advantages and advantageous developments and refinements of the invention will be described and explained in more detail with reference to the drawing which shows and exemplary embodiment of the invention.

DESCRIPTION OF THE PREFERRED EMBODIMENT

Figure 1:
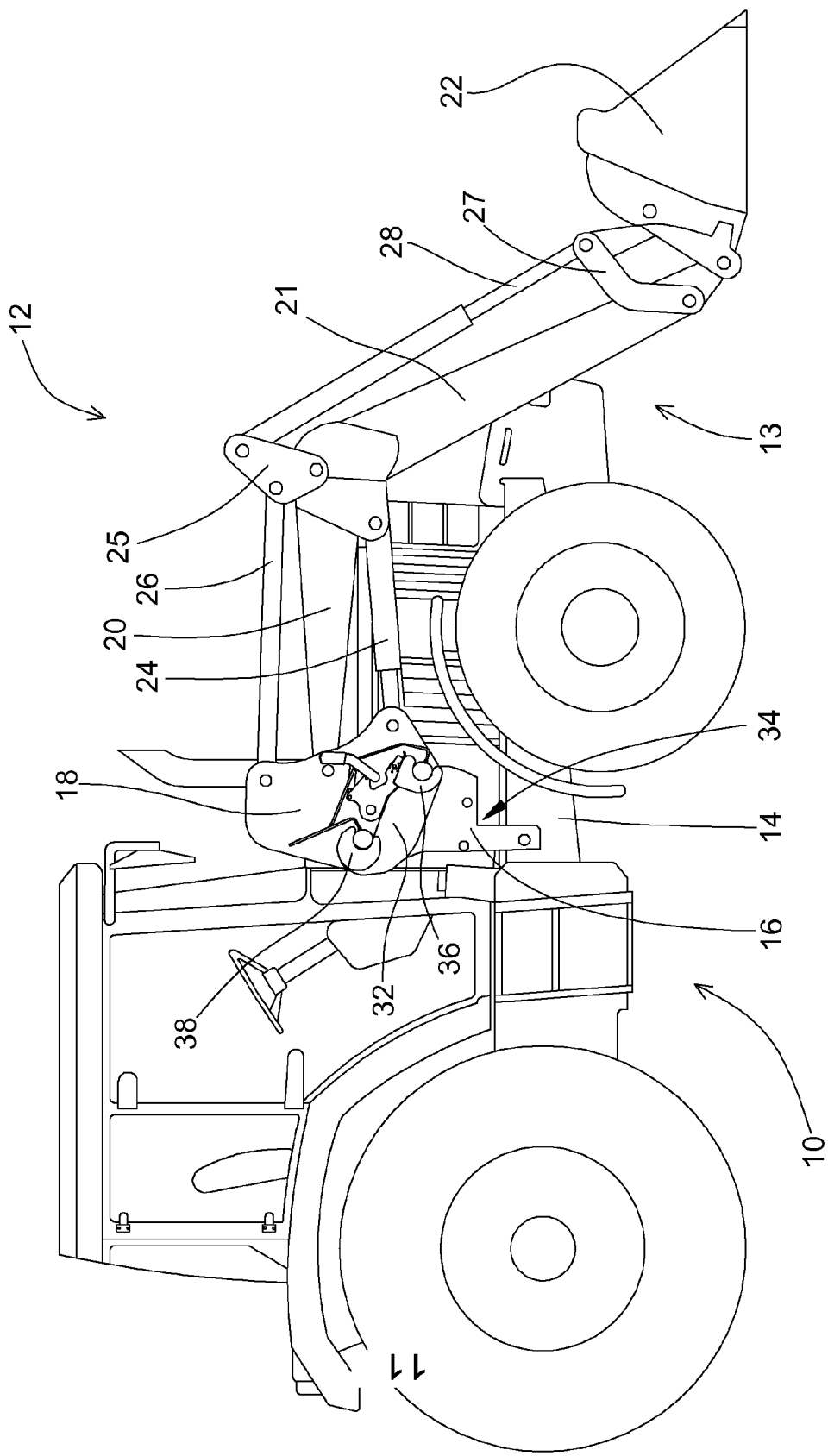
FIG. 1 is a schematic side view of an agricultural vehicle with a front loader arrangement.

FIG. 1 illustrates an agricultural vehicle in the form of a tractor 10 (carrier vehicle). The tractor 10 has a mounted front loader arrangement 12. The front loader arrangement 12 comprises a front loader 13 and mounting frame 16, which are mounted on a vehicle frame 14 of the tractor 10 on both sides of the tractor 10, for the coupling of the front loader 13. The front loader 13 has a mounting mast 18, likewise on both sides of the tractor, by means of which the front loader 13 is coupled to the mounting frame 16 of the front loader arrangement 12 and therefore to the tractor 10.

The front loader arrangement 12 or the front loader 13 has a front loader arm 20 which is fastened pivotably to the mounting mast 18 and to forward ends of which a front loader tool 22 is pivotally connected. The front loader arm 20 extends on opposite sides of the tractor and comprises carriers 21 which run in parallel on the opposite sides of the tractor 10 and are connected to each other via one or more transverse carriers (not shown). The front loader tool 22 is designed, by way of example, in the form of a loading shovel, wherein the front loader tool 22 could also be designed as loading forks, grippers, etc. The front loader arm is pivotable via a pair of hydraulic lifting cylinders 24 which respectively extend at opposite sides of the tractor 10 between the respective mounting masts 18 and the respective carriers 21 of the front loader arm 20. A tilting linkage 26, which serves for the parallel guidance of the front loader tool 22, extends in each case between links 25, which are pivotally connected to the carriers 21 of the front loader arm provided on the opposite sides of the tractor 10, and the respective mounting masts 18. The front loader tool 22 is pivotable on both sides of the front loader arm 20 via a pivoting linkage 27, which is connected to the front loader arm 20 and to the front loader tool 22, and also via a hydraulic pivoting cylinder 28 which is connected to the respective pivoting linkage 27 and to the respective link 25.

The mounting frame 16 has a receiving region 32 for receiving or for the coupling of the mounting mast 18, and a fastening region 34 for fastening the mounting frame 16 to the vehicle frame 14. At the fastening region 34, the mounting frame 16 is screwed to the vehicle frame 14 via screw connections (not shown). The mounting frame 16 has a first (front) catch hook 36 on a lower front region of the receiving region 32 and a second (rear) catch hook 38 on an upper rear region of the receiving region 32, or hook-shaped bearing points in each case.

FIGS. 2 to 8 illustrate a respective combination of the mounting mast 18 and mounting frame 16 at the right side of the front loader arrangement 12 in enlarged form in a plurality of side views and in a plurality of cross-sectional views, in which further individual details of the front loader arrangement 12 are illustrated in detail.

The mounting frame 16 has a ramp 40 or ramp-shaped configuration which extends between the front and rear catch hooks 36 and 38, and, in the lower region of the ramp, a depression or notch 42 is defined directly to the rear of the lower or front catch hook 36.

The mounting mast 18 comprises an upper bearing point and a lower bearing point respectively in the form of an upper bearing bolt 44 and a lower bearing bolt 46. It is conceivable here for the combination of catch hooks 36, 38 and bearing bolts 44, 46 also to be able to be realized in a manner the other way around, such that the bearing bolts 44, 46 are formed on the mounting frame 16 and the catch hooks 36, 38 are formed on the mounting mast 18. Furthermore, an upper pivoting bolt 48, a central pivoting bolt 50 and a lower pivoting bolt 52 are arranged on the mounting mast 18, with the pivoting bolts respectively pivotally connecting the tilt linkage 26, the front loader arm 20 and the hydraulic cylinder 24 to the mounting mast 18.

Figure 9:
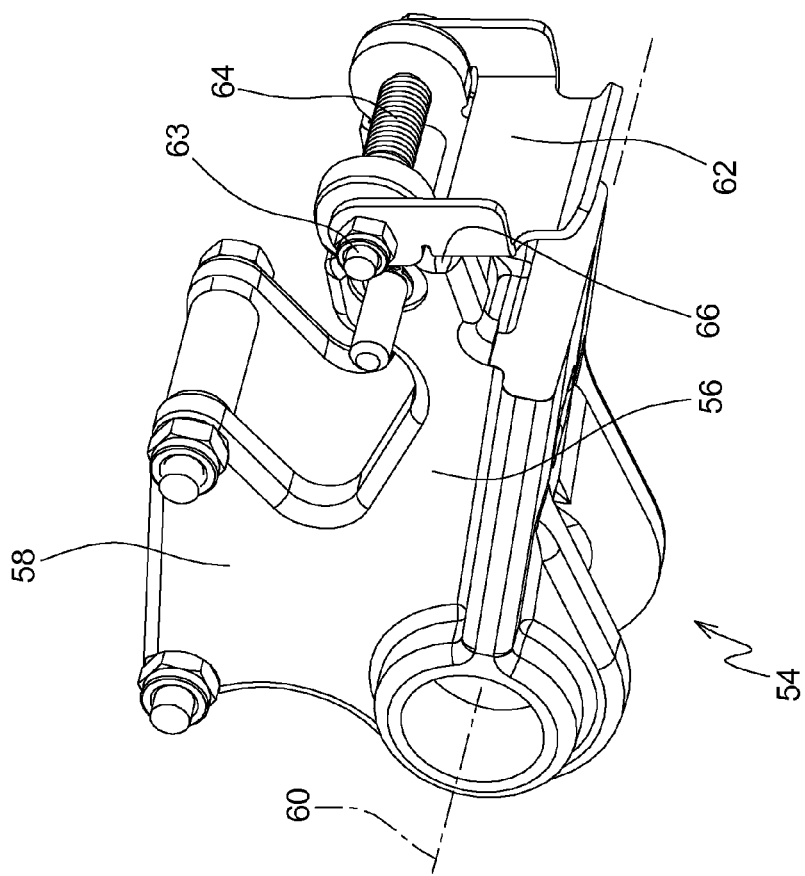
FIG. 9 is a perspective side view of the pivoting lever of the mounting mast from FIGS. 2 to 8.

The mounting mast 18 furthermore comprises a pivoting locking bar 54 (also see FIG. 9) which has a first pivoting arm 56 and a second pivoting arm 58 and is mounted pivotably about a pivot axis 60. A supporting means 62, which is designed in the form of a supporting hinge, is arranged at a free end of the first pivoting arm 56. The supporting means 62 is coupled pivotably to the end of the first pivoting arm 56 by means of a joint 63 and is pre-tensioned by means of a spiral spring 64 in such a manner that said supporting means is pressed or pushed against the end of the first pivoting arm 56 and, in an extreme position, comes to bear against the end of the pivoting arm 56 or against an end surface 66 formed there. The lower side of the first pivoting arm 56, i.e., that side of the pivoting arm 56 which faces the ramp 40, has a step 68 which is formed in a complementary manner to the depression 42 formed on the ramp 40.

The second pivoting arm 58 of the pivoting locking bar 54 is designed to be shorter and is arranged above the first pivoting arm 56, offset at an angle of approximately 70° (counterclockwise in the figures) and, next to the first pivoting arm 56, forms a further lever arm about the pivot axis 60 of the pivoting locking bar 54. The second pivoting arm 58 is connected to a frame part 72 of the mounting mast 18 via a tension spring 70, and therefore the pivoting locking bar 54 is pre-tensioned in the direction of the ramp 40.

Figure 10:
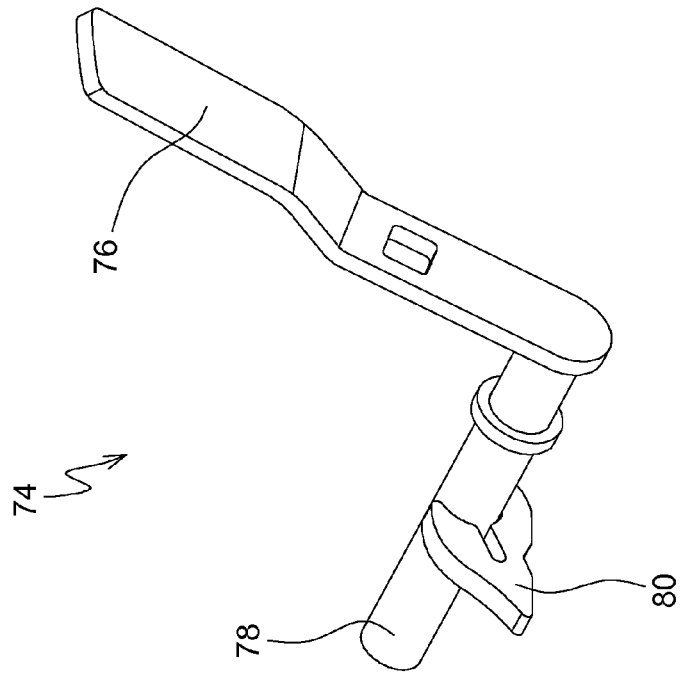
FIG. 10 is a perspective side view of the actuating device for the pivoting locking bar of the mounting mast from FIGS. 2 to 8.

An actuating element 74 (see FIG. 10), via which the pivoting locking bar 54 can be actuated, is arranged between the first and the second pivoting arm 56, 58. The actuating element 74 includes an actuating lever 76 which is accessible on the outside of the mounting mast 18 and extends radially from a shaft 78. The shaft 78 is mounted for rotation on the mounting mast 18 between the two pivoting arms 56, 58. An adjusting arm 80 is formed in a central region of the shaft 78, said adjusting arm extending radially from the shaft 78 and being formed and arranged in such a manner that it can be brought into engagement with the second pivoting arm 58 of the pivoting locking bar 54 by rotation of the shaft 78 and can cancel said engagement and be set into a pivoting movement. The shaft here is set into rotation by pivoting the actuating lever 76 from a basic position (FIGS. 2 to 5, 7 and 8), into an engagement position (corresponding to FIG. 6), whereupon the adjusting arm 80 likewise pivots and is brought into engagement with the upper pivoting arm 58 and therefore with the pivoting locking bar 54, and the pivoting locking bar 54 can be moved from a locking position (see FIG. 5) into an unlocking position (see FIG. 6). The pivoting arm 58, and therefore also the pivoting locking bar 54, is released again by pivoting back.

Figure 2:
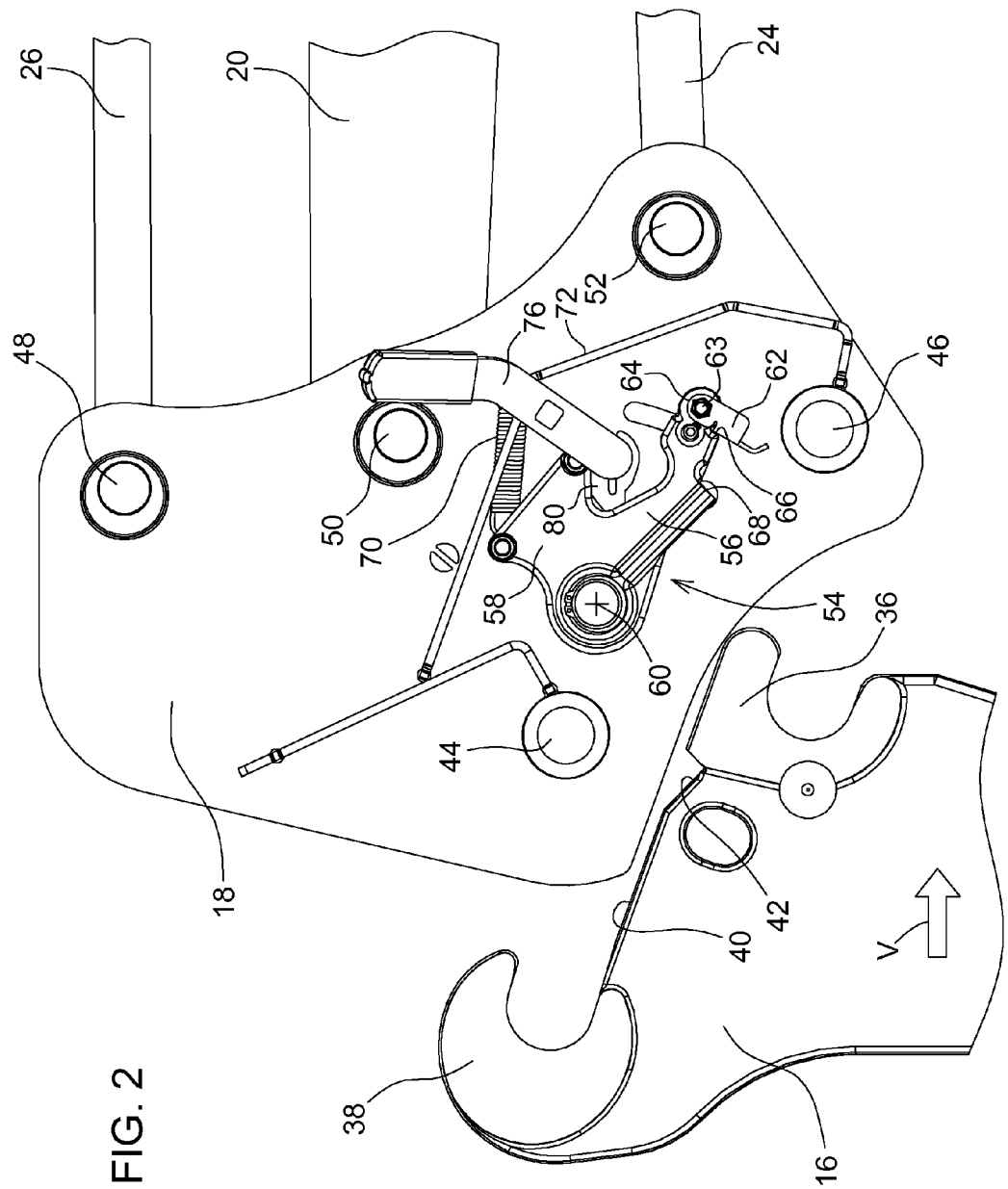
FIG. 2 is a schematic side view of a mounting mast in cross section and of a mounting frame of the front loader arrangement from FIG. 1 in a decoupled state.
Figure 3:
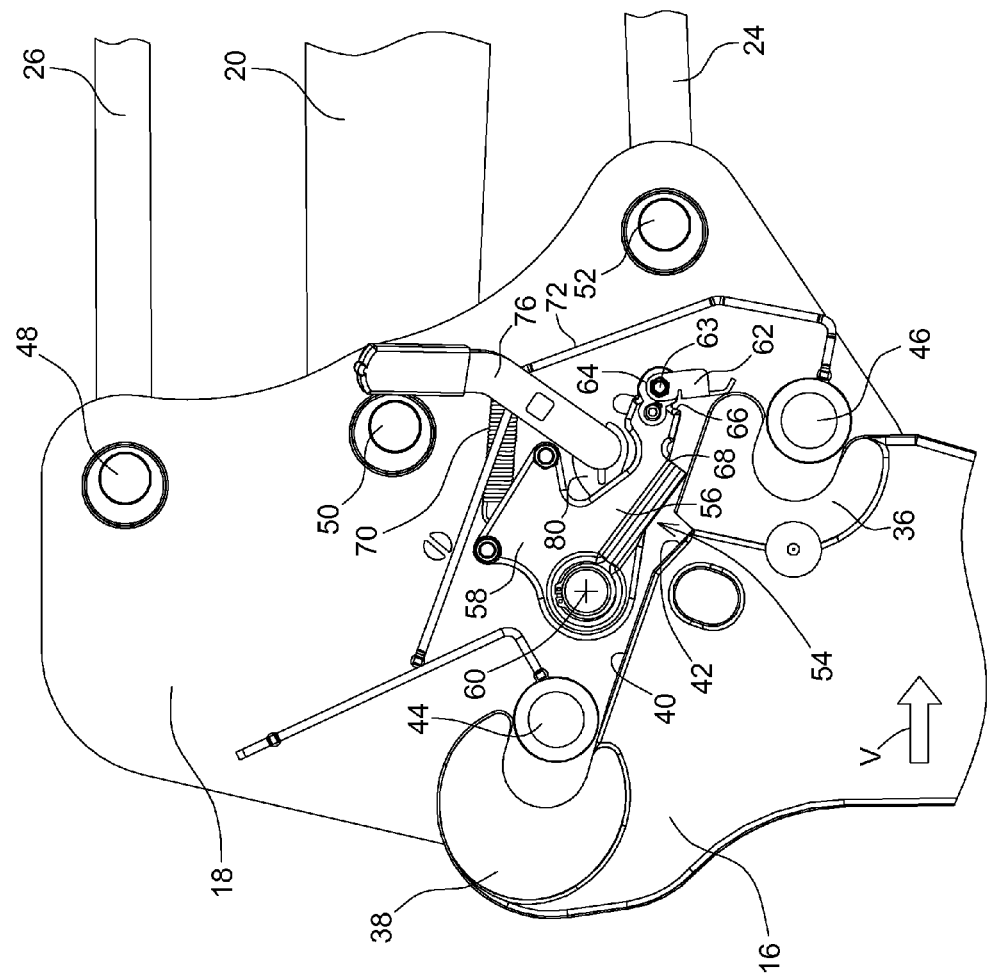
FIG. 3 is a further schematic side view of the mounting mast and of the mounting frame from FIG. 2 in a first coupling state.
Figure 4:
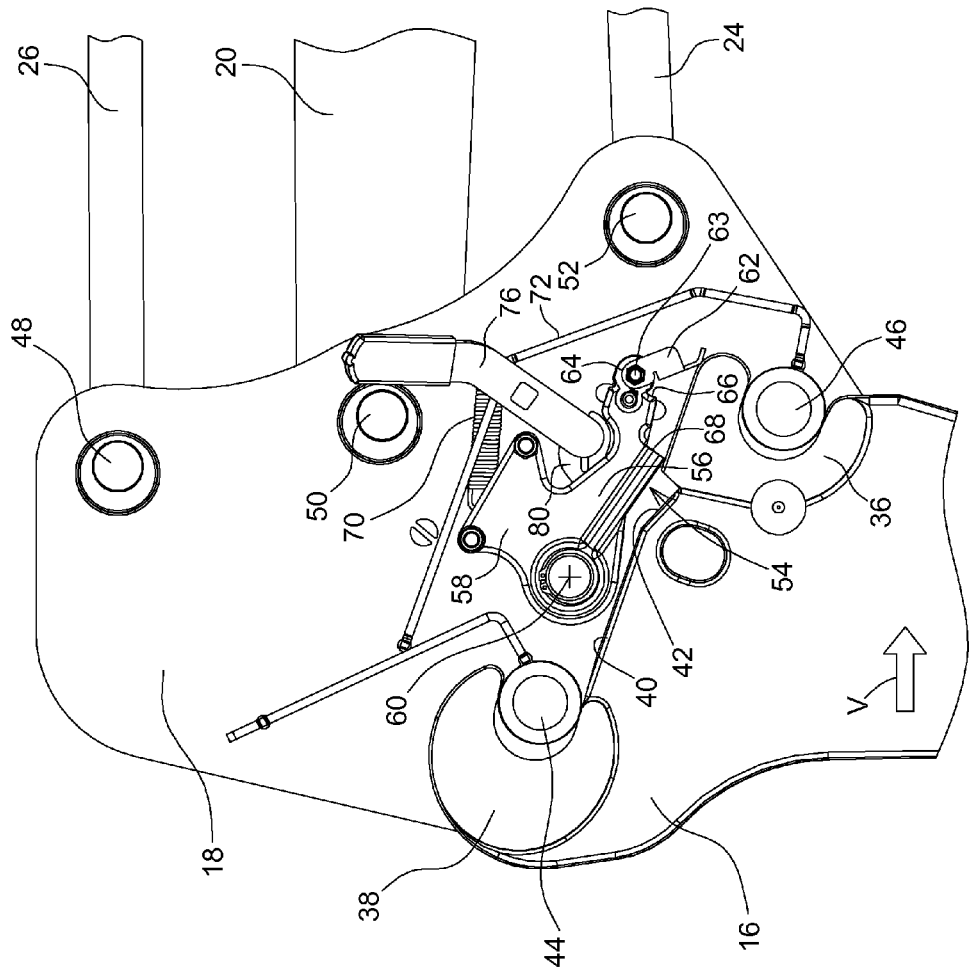
FIG. 4 is a further schematic side view of the mounting mast and of the mounting frame from FIGS. 2 and 3 in a further coupling state.
Figure 5:
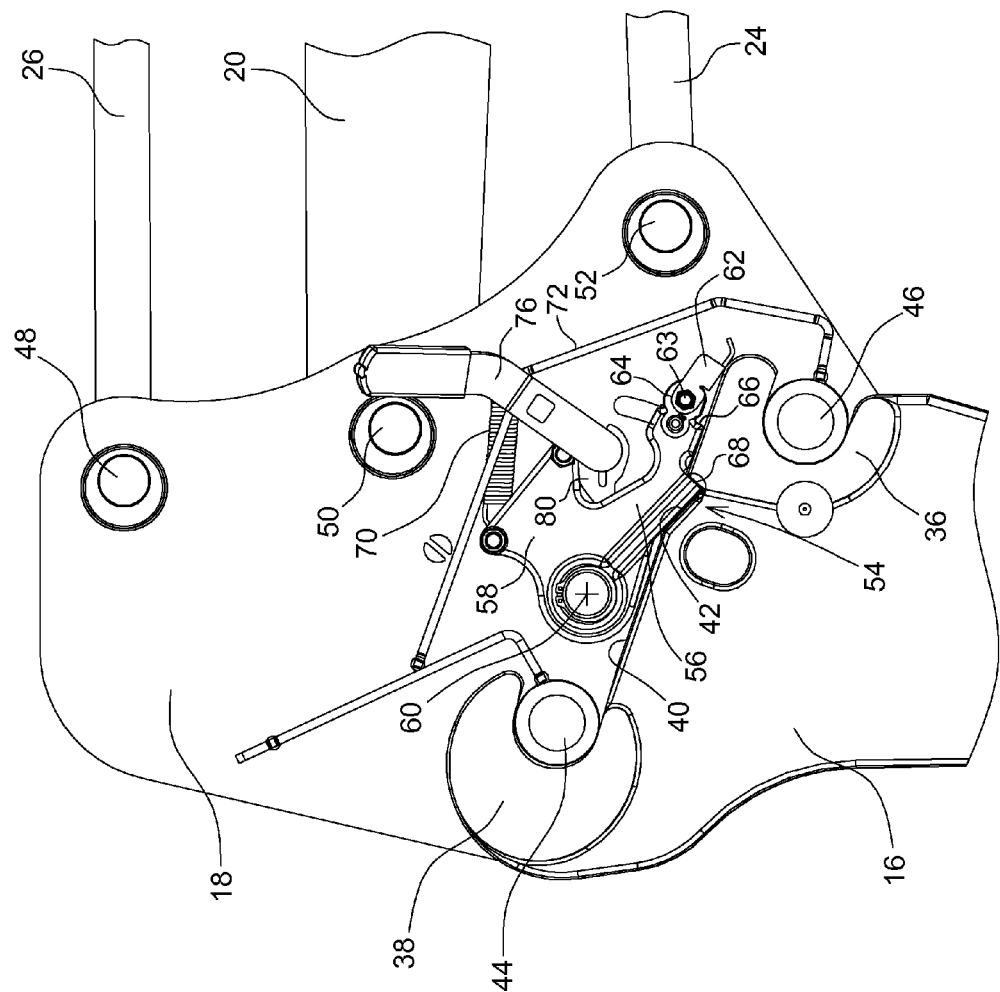
FIG. 5 is a further schematic side view of the mounting mast of the mounting frame from FIGS. 2 to 4 in a coupled state.
Figure 6:
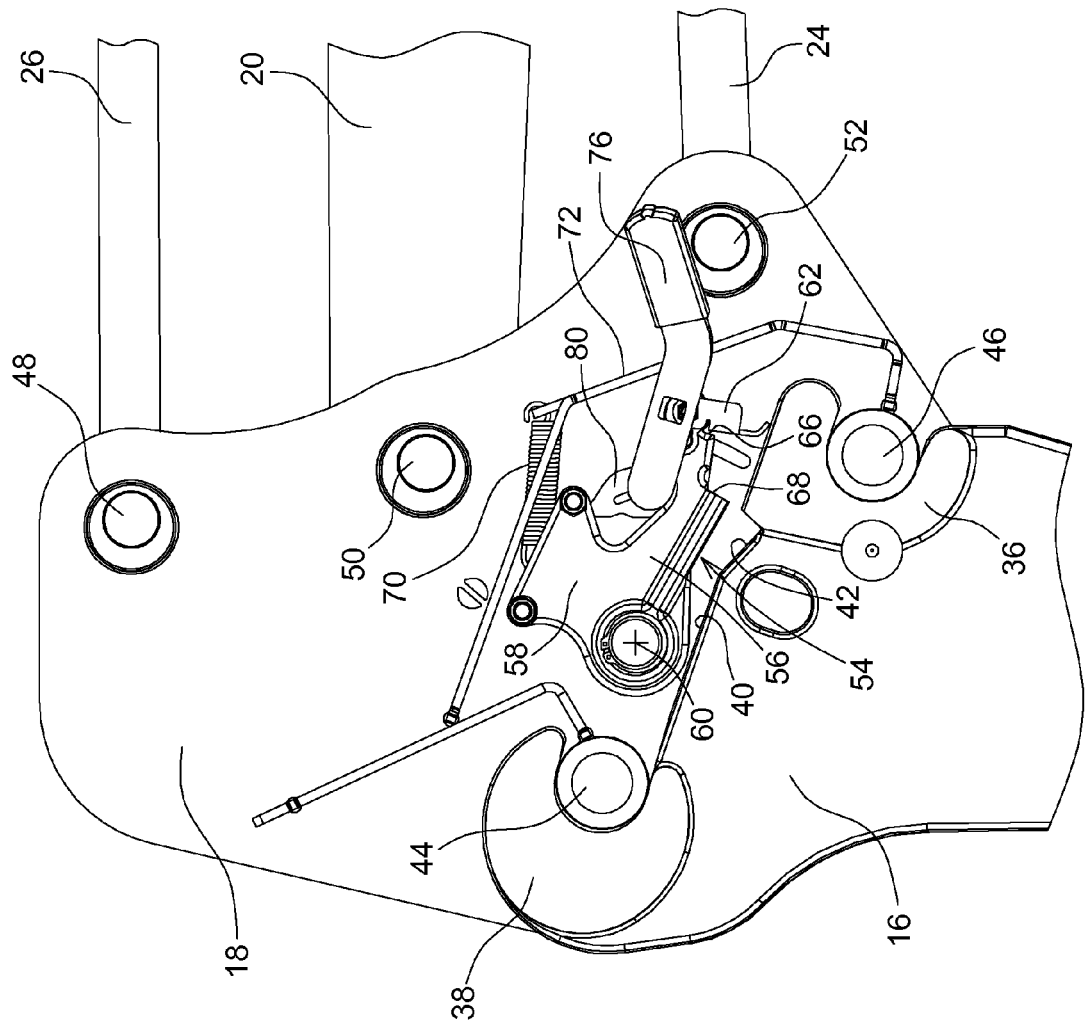
FIG. 6 is a further schematic side view of the mounting mast and of the mounting frame from FIGS. 2 to 5 in a first coupling state.
Figure 7:
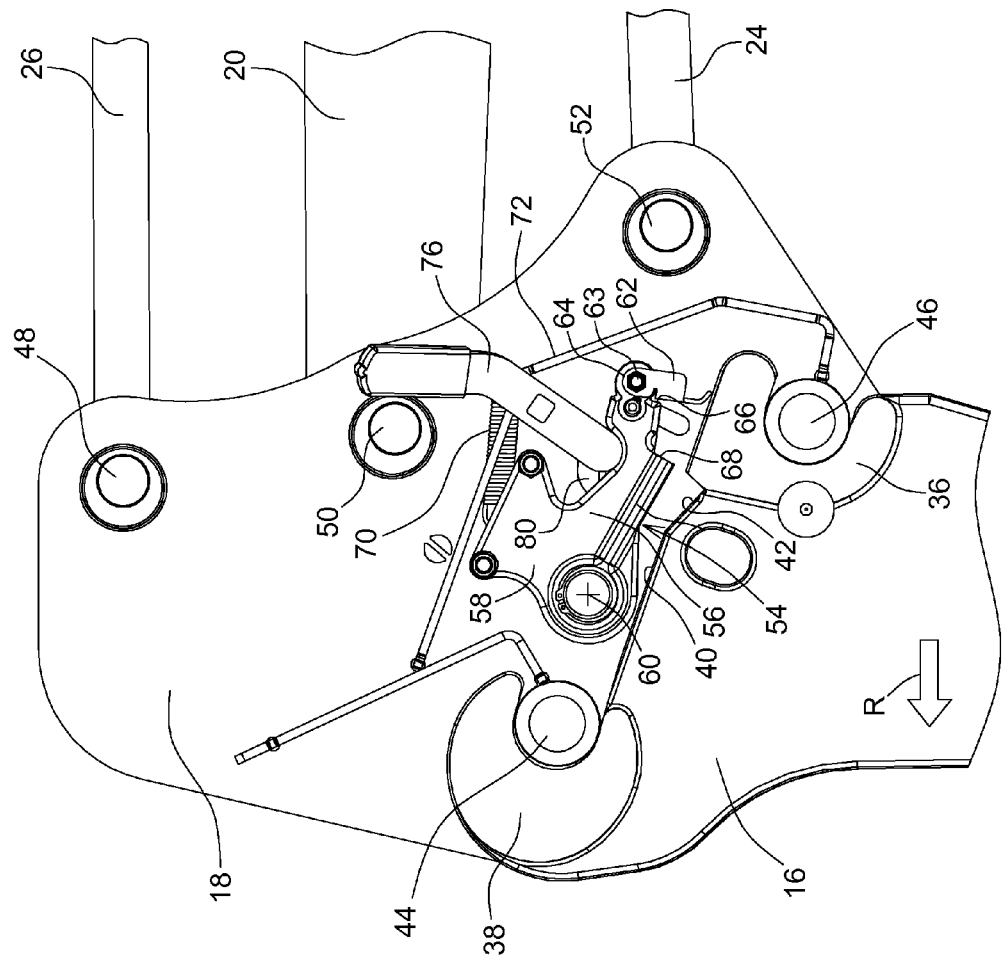
FIG. 7 is a further schematic side view of the mounting mast and the mounting frame from FIGS. 2 to 6 in a further decoupling state.
Figure 8:
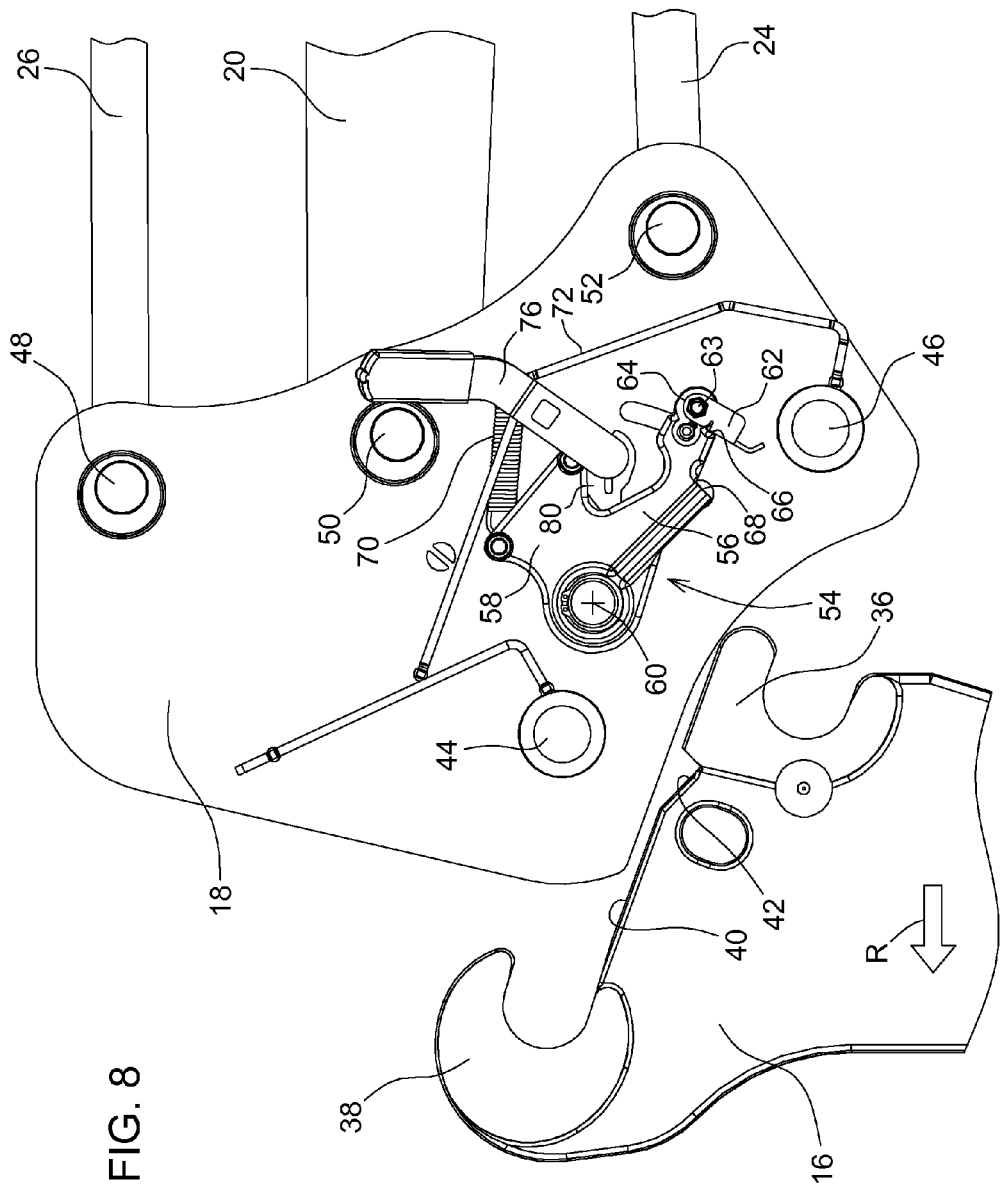
FIG. 8 is a further schematic side view of the mounting mast and the mounting frame from FIGS. 2 to 7 in a decoupled state.

The front loader 13 or the mounting mast 18 is coupled to, or decoupled from, the mounting frame 16 as described below with reference to FIGS. 2 to 8. The mounting frame 16 is moved from a decoupled state, in which the front loader 13 is set down and is separated hydraulically and mechanically from the tractor, in the direction of the mounting mast 18 corresponding to the movement indicated by the arrow V (FIG. 2). The upper bearing bolt 44 begins to enter into engagement with the ramp 40 and slides up along the inclined plane of the ramp 40 and along the ramp surface until the bearing bolt enters into engagement with the upper catch hook 38 (FIGS. 3 and 4). At this same time, the lower bearing bolt 46 enters into engagement with the lower catch hook 36 (FIGS. 3 and 4). Approximately at the time at which the bearing bolts 44, 46 enter into engagement with the catch hooks 38, 36 (FIG. 3), the lower catch hook 36, or a lower end of the ramp 40, abuts against the supporting means 62 and begins to pivot the latter counter to the pre-tensioning thereof from the position thereof, which is oriented substantially perpendicularly to the ramp surface and in which the supporting means takes up the supporting position, into an increasingly deflected position (see FIGS. 3 to 5). When the supporting position of the supporting means 62 is cancelled, the spring 70 on the pivoting locking bar 54 causes the latter to move with the lower pivoting arm 56 thereof in the direction of the ram surface such that, finally, the step 68 of the lower pivoting arm 56 comes to bear against the ramp 40 and slides up along the ramp (FIGS. 3 and 4). As can best be seen in FIG. 5, the mounting mast 18 reaches an end position relative to the mounting frame 16, in which end position the bearing bolts 44, 46 come to bear completely in the catch hooks 38, 36. At the same time, the spring pre-tensioned pivoting locking bar 54 takes up the locking position thereof and latches with the step 68 formed on the first pivoting arm 56 in the depression 42 such that the mounting mast 18 is locked to the mounting frame 16, since relative movement between mounting mast 18 and mounting frame 16 is now blocked firstly by the catch hooks and secondly by the step 68 which has come to bear in the depression 2. The front loader is now in the operating position and can be put into operation. FIGS. 6 to 8 show the unlocking of the front loader, i.e., the decoupling of the mounting mast 18 from the mounting frame 16. The pivoting locking bar 54 is brought here from the locking position thereof into an unlocking position by means of the actuating element 74, as described above (FIG. 6). At the same time, the spring pre-tensioned supporting means 62 can thereby take up the supporting position thereof and the pivoting locking bar 54 can be released again from the actuating element 74 by the actuating lever being brought again into the basic position thereof. The pivoting locking bar 54 is now held in the unlocking position by the supporting means 62. In this state, the mounting mast 18 is unlocked from the mounting frame 16, and therefore the mounting frame 16 can be removed from the mounting mast 18, as indicated by the arrow R in FIGS. 7 and 8. By means of the relative movement between mounting mast 18 and mounting frame 16 and the sliding of the supporting means 62 along the ramp surface, the supporting means 62 is pushed against the end surface 66 of the pivoting arm 56, as a result of which the supporting means maintains the supporting position thereof and the pivoting locking bar 54 cannot snap back into the depression (FIG. 7). By moving the mounting frame 16 away, i.e., by backing the tractor 10, the mounting frame 16 can now be removed from the mounting mast 18, i.e., from the front loader 13, so that the decoupling of the mounting mast 18 from the mounting frame 16 is finished d(FIG. 8). So that the front loader 13 can be completely separated and removed from the tractor 10, the hydraulic supply of the lifting cylinder 24 has to be decoupled previously. The operator can undertake this in parallel with the unlocking of the pivoting locking bar 54, i.e., in a working sequence, the pivoting locking bar 54 is removed and the hydraulic supply disconnected.

Figure 11:
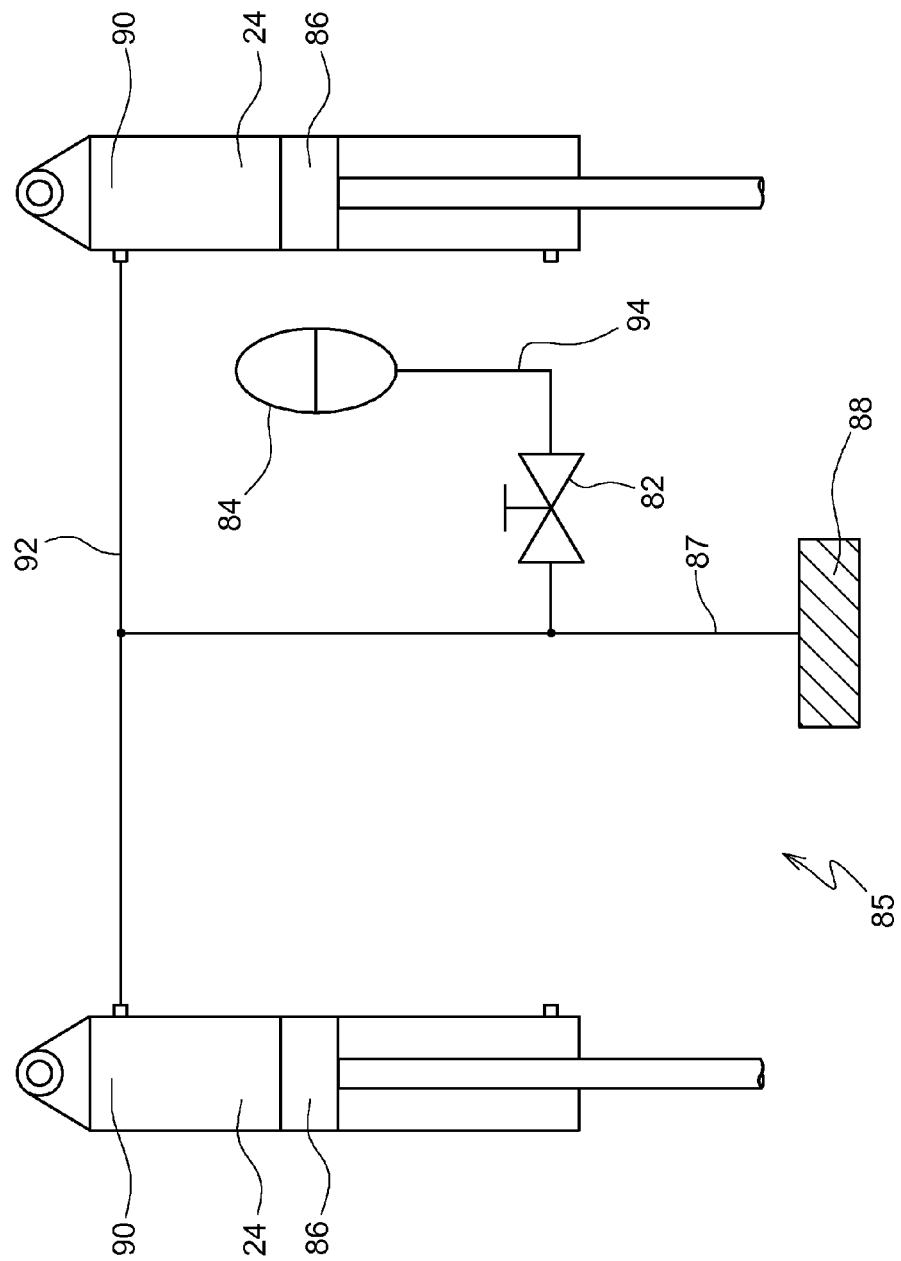
FIG. 11 is a schematic hydraulic circuit diagram for a front loader arrangement with single-acting hydraulic cylinders.
Figure 12:
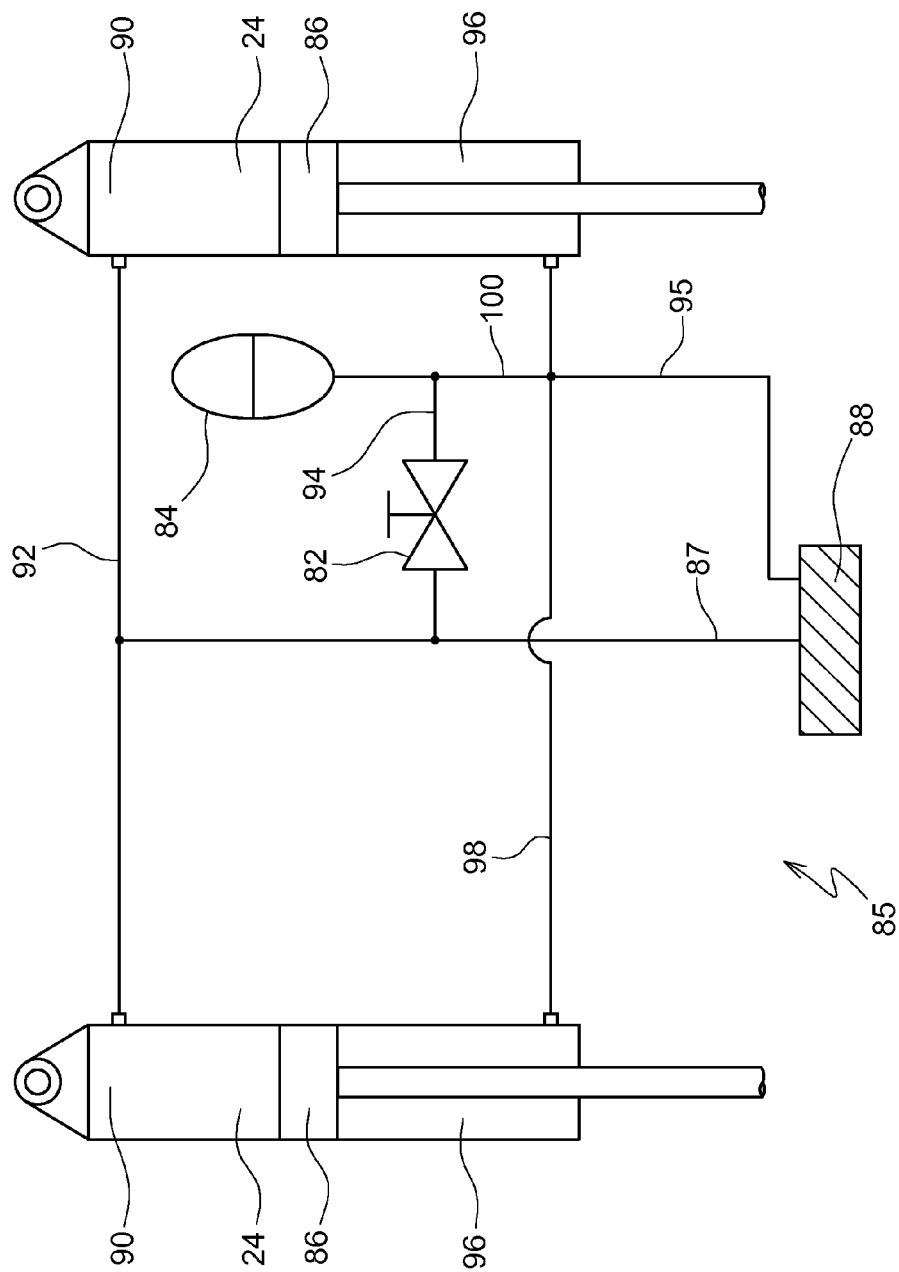
FIG. 12 is a schematic hydraulic diagram for a front loader arrangement with double-acting hydraulic cylinders.

In order to make coupling easier, it is expedient, as has already been described, that, during the coupling, the mounting mast 18 can be adapted as freely as possible to the position of the mounting frame 16 such that the bearing bolts 44, 46 are guided as exactly and precisely as possible into the catch hooks. This is achieved in that the rigid connection between the mounting mast 18 and loader arm 20, in which, when the hydraulic supply is disconnected, the lifting cylinders remain in the position thereof which they have thus taken up and hold the mounting mast 18 rigidly with respect to the loader arm 20, is cancelled. The mounting mast 18 is thereby brought into a movable state in which the mounting mast can be pivoted relative to the loader arm 20. For this purpose, as FIGS. 11 and 12 schematically show, a shut-off valve 82 and a hydraulic accumulator 84 are provided, wherein FIG. 11 illustrates a hydraulic circuit for a single-acting lifting cylinder and FIG. 12 illustrates a double-acting lifting cylinder. In both cases, the shut-off valve 82 is designed to be manually actuated and can be actuated by an operator, during the coupling and decoupling of the front loader 13, when the hydraulic supply is connected or disconnected.

With regard to FIG. 11, part of the hydraulic system 85 for the supply of two lifting cylinders 24 each acting on one side of the tractor is depicted, the lifting cylinders having a piston 86 and being hydraulically supplied via a hydraulic supply line 87, wherein the supply line 87 extends from a coupling part 88 of a hydraulic quick coupler (not shown) to head end chambers 90 of the lifting cylinders 24. As can be seen in FIG. 1, the head end of the lifting cylinder 24 on the right side of the tractor 10 is connected to the loader arm 20 and on the rod end is connected to the mounting mast 18, with it being understood that the lifting cylinder 24 on the left side of the tractor is similarly connected, and therefore the loader arm 20 can be raised by hydraulic filling of the head end chambers 90. The loader arm 20 is lowered here because of gravitational force, wherein a control valve (not shown) of the hydraulic system 85 is correspondingly actuated in order to raise and lower the front loader, and the hydraulic oil can be pressed out of the head end chambers 90 by the dead weight of the front loader. The two lifting cylinders 24 are furthermore connected to each other by a connecting line 92 and are connected to the supply line 87, and therefore the two lifting cylinders are pressurized uniformly. The shut-off valve 82 is arranged in a connecting line 94 which connects the supply line 87 to the hydraulic accumulator 84. By opening of the shut-off valve 82, it is ensured that, when the hydraulic supply is disconnected, the hydraulic fluid is not trapped in the head end chambers 90, but rather can escape into the hydraulic accumulator 84, and vice versa. As a result, the lifting cylinders 24 can take up a floating movement of the mounting mast 18 in relation to the loader arm 20, and therefore, when the shut-off valve 82 is open, the mounting mast 18 can be aligned in a freely pivotable manner during the coupling. The opening of the shut-off valve 82 already ideally takes place during the decoupling of the front loader 13 and can thus be carried out by an operator in one working sequence together with an unlocking of the pivoting locking bar 54 and the separating of the hydraulic supply (separating of the quick coupler). Owing to the fact that the opening of the shut-off valve 82 already takes place during decoupling of the front loader 13, the latter is already prepared for the next coupling operation, and therefore an operator can couple the front loader 13 to the freely movable mounting mast 18 without leaving the tractor 10. After the coupling of the front loader 13, the shut-off valve 82 has to be closed for the starting up of the hydraulic function (connecting of the hydraulic supply) in order to ensure a hydraulic operation of the front loader 13. This can likewise take place in one working sequence together with the connection of the quick coupler.

With regard to FIG. 12, a part of a hydraulic system 85 for the hydraulic supply of two double-acting lifting cylinders 24 is depicted, the lifting cylinders having a piston 86 and by hydraulically supplied via a hydraulic supply line 87 and a hydraulic supply line 95. The supply line 87 extends from a coupling part 88 of a hydraulic quick coupler (not shown) to head end chambers 90 of the lifting cylinders 24, wherein the supply line 95 extends from the coupling part 88 to rod end chambers 96. As with the single-acting lifting cylinders 24 described above, the double-acting lifting cylinders 24 at the opposite sides of the tractor 10 have their head ends connected to the loader arm 20 and their rod ends respectively coupled to the masts 18 at the opposite sides of the tractor such that the loader arm 20 is raised and lowered by hydraulic filling of the head end chambers 90, wherein a corresponding activation of a control valve (not shown) of the hydraulic system 85 takes place in a known manner for lifting and lowering the front loader. The head end chambers 90 of the two lifting cylinders 24 are connected to each other by a connecting line 92 that is connected to the supply line 87. Furthermore, the rod end chambers 96 of the lifting cylinders 24 are connected to each other by a connecting line 98 that is connected to the supply line 95. As a result, the two hydraulic cylinders 24 are pressurized uniformly. The hydraulic accumulator 84 is connected to the supply line 95 via a connecting line 100 and therefore also to the connecting line 98 and to the rod end chambers 96. The shut-off valve 82 is arranged in a line 94 coupled between the supply line 87 and the connecting line 100.

By opening the shut-off valve 82, it is ensured that, when the hydraulic supply is disconnected, the hydraulic fluid is not trapped in the chambers 90, 96, but rather can escape into the hydraulic accumulator 84 and into the respective other chamber 90, 96, and vice versa. As a result, the lifting cylinders 24 can take up a floating position in which the pistons 86 are freely movable, wherein volume differences between the head end chambers 90 and the rod end chambers 96 are compensated for by the hydraulic accumulator 84. This state, in turn, permits a relatively free movement of the mounting masts 18 in relation to the loader arm 20, and therefore, when the shut-off valve 82 is open, the mounting masts 18 can be aligned in a freely pivotable manner during the coupling. The opening of the shut-off valve 82 during decoupling of the front loader 13 can take place here in one working sequence together with unlocking of the pivoting locking bar 54 and the separating of the hydraulic supply (separating the quick coupler) by an operator. Owing to the fact that the shut-off valve 82 is already opened during the decoupling of the front loader 13, the latter is also already prepared her for the next coupling operation, and therefore an operator can couple the front loader 13 to the freely movable mounting masts 18 without leaving the tractor 10. The shut-off valve 82 also has to be closed here, after the coupling of the front loader 13, for starting up of the hydraulic function (connecting of the hydraulic supply), in order to ensure a hydraulic operation of the front loader 13. However, this can likewise take place in one working sequence together with the connection of the quick coupler.

Having described the preferred embodiment, it will become apparent that various modifications can be made without departing from the scope of the invention as defined in the accompanying claims.

The invention claimed is:

1. In a front loader arrangement (12) including an upright mounting frame (16) having a fastening region (34) adapted to be secured to a carrying vehicle and having an upper receiving region (32) provided with a first set of two coupling members defined by one of front and rear catch hooks (36 and 38) or front and rear bearing bolts (46 and 44), a mounting mast (18) being provided with a second set of two coupling members (36 and 38 or 46 and 44) which are complementary to the first set of two coupling members, with the bearing bolts (46 and 48) being respectively fully seated in the catch hooks (36 and 38) when the mast (18) is in a locking position on said mounting frame (16), and a locking device comprising a pivoting locking bar (54) pivotally mounted to the mast (18) for relative movement between a locking position and an unlocking position, the improvement comprising: said locking bar including a supporting hinge (62) mounted for movement at one end of the locking bar (54) and being so constructed and disposed at said one end of the locking bar (54) and so disposed relative to said receiving region of said mounting frame (16) that upon the locking bar (54) being pivoted from said locking position toward said unlocking position during decoupling, the supporting hinge (62) will move into a supporting position blocking return of the locking bar (54) to its locking position and permitting movement of the bearing bolts (46 and 44) from the catch hooks (36 and 38), and with the supporting hinge further being so disposed relative to the fastening region (34) during coupling of the mounting mast (18) to the mounting frame (16) that the fastening region (34) contacts and moves the supporting hinge (62) from its supporting position thus permitting the locking bar (54) to pivot to its locking positon when the bearing bolts (46 and 44) once again become seated in the catch hooks (36 and 38).

2. The front loader arrangement (12), as defined in claim 1, and further including a spring connected to said locking bar (54) and resiliently resisting movement of said locking bar (54) from said locking position.

3. In a front loader arrangement (12) including an upright mounting frame (16) having a fastening region (34) adapted to be secured to a carrying vehicle and having an upper receiving region (32) provided with a first set of two coupling members defined by one of front and rear catch hooks (36 and 38) or front and rear bearing bolts (46 and 44), a mounting mast (18) being provided with a second set of two coupling members (36 and 38 or 46 and 44) which are complementary to the first set of two coupling members, with the bearing bolts (46 and 48) being respectively fully seated in the catch hooks (36 and 38) when the mast (18) is in a locking position on said mounting frame (16), and a locking device comprising a pivoting locking bar (54) pivotally mounted to the mast (18) for relative movement between a locking position and an unlocking position, the improvement comprising: said locking bar (54) including a supporting means (62) mounted for movement at one end of the locking bar (54) and being so constructed and disposed at said one end of the locking bar (54) and so disposed relative to said receiving region of said mounting frame (16) that upon the locking bar (54) being pivoted from said locking position toward said unlocking position during decoupling, the supporting means (62) will move into a supporting position blocking return of the locking bar (54) to its locking position and permitting movement of the bearing bolts (46 and 44) from the catch hooks (36 and 38), and with the supporting means further being so disposed relative to the fastening region (34) during coupling of the mounting mast (18) to the mounting frame (16) that the fastening region (34) contacts and moves the supporting means (62) from its supporting position thus permitting the locking bar (54) to pivot to its locking positon when the bearing bolts (46 and 44) once again become seated in the catch hooks (36 and 38) and wherein the fastening region (34) of the mounting frame (16) defines a ramp (40) along which the mounting mast (18) can be displaced and guided for coupling and decoupling purposes, with said ramp (40) including a depression (42), and wherein said locking bar (54) is branched and includes a first arm (56) provided with a step (68) which is shaped complementary to said depression (42) and directed towards the ramp (40) and can be brought into engagement with the depression (42) by a pivoting movement of the locking bar (54) once the bearing bolts (46 and 48) become seated in the catch hooks (36 and 38) during coupling of the mast (18) to the mounting frame (16).

4. The front loader arrangement (12), as defined in claim 3, wherein said supporting means (62) is mounted at a free end of the first arm (56) of the locking bar (54); a spring being coupled to, and pre-tensioning said supporting means (62) such that said spring resiliently resists movement of said supporting means (62) from said supporting position, said supporting means (62) being in contact with said fastening region and held in a spring-loaded, non-supporting position when the mast (18) is coupled to said mounting frame (16), whereby, upon the locking bar (54) being pivoted towards said unlocking position so as to disengage the step (68) from the depression(40), the spring-loaded supporting means (62) will be moved into a supporting position wherein it extends between the locking bar (54) and the mounting frame (16) so as to prevent the locking bar from being pivoted so as to re-engage the step (68) with the depression (42).

5. The front loader arrangement (12), as defined in claim 4, wherein said supporting means (62) is hinged for pivotal movement at said free end of the first arm (56) of the locking bar (54) and said spring is a spiral spring (64) loaded so that the supporting means (62) is biased to said supporting position.

6. In a front loader arrangement (12) including an upright mounting frame (16) having a fastening region (34) adapted to be secured to a carrying vehicle and having an upper receiving region (32) provided with a first set of two coupling members defined by one of front and rear catch hooks (36 and 38) or front and rear bearing bolts (46 and 44), a mounting mast (18) being provided with a second set of two coupling members (36 and 38 or 46 and 44) which are complementary to the first set of two coupling members, with the bearing bolts (46 and 48) being respectively fully seated in the catch hooks (36 and 38) when the mast (18) is in a locking position on said mounting frame (16), and a locking device comprising a pivoting locking bar (54) pivotally mounted to the mast (18) for relative movement between a locking position and an unlocking position, the improvement comprising: said locking bar (54) including a supporting means (62) mounted for movement at one end of the locking bar (54) and being so constructed and disposed at said one end of the locking bar (54) and so disposed relative to said receiving region of said mounting frame (16) that upon the locking bar (54) being pivoted from said locking position toward said unlocking position during decoupling, the supporting means (62) will move into a supporting position blocking return of the locking bar (54) to its locking position and permitting movement of the bearing bolts (46 and 44) from the catch hooks (36 and 38), and with the supporting means further being so disposed relative to the fastening region (34) during coupling of the mounting mast (18) to the mounting frame (16) that the fastening region (34) contacts and moves the supporting means (62) from its supporting position thus permitting the locking bar (54) to pivot to its locking positon when the bearing bolts (46 and 44) once again become seated in the catch hooks (36 and 38), and further including an actuating device (74) including a shaft (78) pivotally mounted to the mast (18) at a location adjacent the locking bar (54), an actuating lever (76) fixed to an end of the shaft (78) and an adjusting arm (80) being fixed to, and extending radially from, the shaft (78) in a location for engaging and pivoting the locking bar (54) from the locking position to the unlocking position upon rotation of the actuating lever from a corresponding locking position to a corresponding unlocking position.

7. The front loader arrangement (12), as defined in claim 6, and further including a spring connected to said locking bar (54) and resiliently resisting movement of said locking bar (54) from said locking position.

8. In a front loader arrangement (12) including an upright mounting frame (16) having a fastening region (34) adapted to be secured to a carrying vehicle and having an upper receiving region (32) provided with a first set of two coupling members defined by one of front and rear catch hooks (36 and 38) or front and rear bearing bolts (46 and 44), a mounting mast (18) being provided with a second set of two coupling members (36 and 38 or 46 and 44) which are complementary to the first set of two coupling members, with the bearing bolts (46 and 48) being respectively fully seated in the catch hooks (36 and 38) when the mast (18) is in a locking position on said mounting frame (16), and a locking device comprising a pivoting locking bar (54) pivotally mounted to the mast (18) for relative movement between a locking position and an unlocking position, the improvement comprising: said locking bar (54) including a supporting means (62) mounted for movement at one end of the locking bar (54) and being so constructed and disposed at said one end of the locking bar (54) and so disposed relative to said receiving region of said mounting frame (16) that upon the locking bar (54) being pivoted from said locking position toward said unlocking position during decoupling, the supporting means (62) will move into a supporting position blocking return of the locking bar (54) to its locking position and permitting movement of the bearing bolts (46 and 44) from the catch hooks (36 and 38), and with the supporting means further being so disposed relative to the fastening region (34) during coupling of the mounting mast (18) to the mounting frame (16) that the fastening region (34) contacts and moves the supporting means (62) from its supporting position thus permitting the locking bar (54) to pivot to its locking positon when the bearing bolts (46 and 44) once again become seated in the catch hooks (36 and 38), and further including a loader arm (20) having a rear end pivotally coupled to the mast (18) for pivoting vertically about a horizontal pivot axis defined by a pivoting bolt (50); and a hydraulic lifting cylinder (24) being connected between the loader arm (20) and the mounting mast (18) and having a head end chamber (90); a hydraulic system (85) including a connecting line (92) coupled to the head end chamber (90) and adapted for being coupled to a hydraulic fluid supply together with a control arrangement for selectively controlling raising and lowering of the loader arm (20) when the mast (18) is coupled to the loader arm (20); and said hydraulic system (85) further including adjustment means (82, 84, 94) connected to said connecting line (92) for selectively bringing the hydraulic cylinder (24) into a floating condition after the hydraulic fluid supply is decoupled.

9. The front loader arrangement (12), as defined in claim 8, wherein the adjustment means (82, 84, 94) includes a hydraulic accumulator (84) and a shut-off valve (82) coupled to a head end chamber (90) of the hydraulic cylinder (24) via connecting lines (87, 92) whereby the floating condition of the hydraulic cylinder (24) is established by opening the shut-off valve (82) so as to fluidly connect the accumulator (84) with the head end chamber (90).

10. The front loader arrangement (12), as defined in claim 9, wherein the hydraulic cylinder (24), in addition to the head end chamber (90), has a rod end chamber (96) and is capable of being operated as a double-acting cylinder and for such operation said hydraulic system (85) includes a connecting line (98) connected to the rod end chamber (96) and being adapted for connection to the hydraulic fluid supply and associated control arrangement when the mast (18) is coupled to the connecting frame (16); and said rod end chamber (96) being directly fluid connected to said accumulator (84) and shut-off valve (82), whereby the floating condition of the hydraulic cylinder (24) is established by opening the shut-off valve (82) so as to connect said head end chamber (90) to said rod end chamber (96).

11. An agricultural vehicle (10) equipped with a front loader arrangement (12) as defined in any one of claims 1 through 10.

* * * * *